United States Patent Office 2,950,206
Patented Aug. 23, 1960

2,950,206

FINISHING MORTARS

Jarl Olle Börje Östergren, Stockholm, Sweden, assignor to Nya Murbruksfabrikens i Stockholm Aktiebolag, Stockholm, Sweden No Drawing. Filed Mar. 14, 1956, Ser. No. 571,365

Claims priority, application Sweden Mar. 19, 1955

3 Claims. (Cl. 106—119)

For thousands of years it has been known to produce mortar and finishing mortar of slaked lime and sand. By applying the mortar in several layers it is possible to obtain a more and more even and smooth surface. When the requirements with respect to the evenness of the surface are particularly high, the wall finished with mortar must be putted one or more times with oil paint putty, for instance, before applying the final layers of paint. In many cases it is, however, possible to obtain, by the use of new building methods, for example by casting concrete against particularly well-built moulds, such a high degree of evenness or smoothness of surface that the ordinary application of finishing mortar in several layers may be dispensed with. Attempts have been made to use either a thinner finishing mortar or to combine the operations of applying finishing mortar and putty to a single working step in order thereby to gain time and reduce the building costs.

Modern chemistry has produced new substances which open up roads for new working methods and processes. It is thus known to finish indoor walls with a finishing mortar consisting of a water solution of methyl or ethyl cellulose ether and inorganic filler substances having various dimensions of grain and also to add to a mortar composed in the said manner a hydraulic binding agent, such as cement or gypsum. In practice it has been found, however, that finishing mortar of this kind is liable to shrink. This results in that the finished surface will crack and will sink at places where the layer applied is thicker than at other places. Any unevennesses present in the backing will, therefore, appear after some time and the surface cannot for certain be given the required evenness through the final painting. Furthermore, the finishing mortar in question has the very great inconvenience that it hardens or binds in a very short time after mixing, as a rule within a few hours, also when kept in closed vessels, wherefore the finishing mortar must be used immediately after mixing, and consequently must be prepared at the place of use.

It is an object of the present invention to avoid said inconveniences by producing a finishing mortar, particularly for use indoors, which may be stored in closed vessels for a practically unlimited time without hardening but which on application on the wall will harden rapidly without shrinking and which therefore neither cracks nor sinks even when applied to fill rather deep cavities. A finishing mortar having said properties is characterized in that it consists of a mixture of fine-grained stone material, slaked lime, water-soluble cellulose ether, and water.

As lime constituent in the novel finishing mortar is preferably used dry-slaked lime, so-called powder-lime. By the said term is meant a burnt lime which has been slaked with so small a quantity of water that the lime has disintegrated into an exceedingly fine powder. Said powder should be relieved of all possibly remaining larger grains by screening, for instance wind-screening. Powder lime thus consists of finely divided calcium hydroxide, possibly with some remaining insignificant amounts of impurities. A preferred cellulose ether is ethyl cellulose ether (ethyl hydroxy ethyl cellulose), for example Modocoll E or Modocoll M. Water solutions of cellulose ether have a high viscosity and a low surface tension. On drying transparent flexible and very strong films are obtained. Neither the water solution nor the dried films are damaged by frost.

The advantageous properties of a mixture of slaked lime and cellulose ether as a binding agent in a finishing mortar probably depend on the capacity of said substances of binding in different manner and with different rapidity. The slaked lime reacts comparatively slowly with the carbon dioxide of the air while giving off water to produce carcium carbonate which forms a rigid skeleton between the other particles of the mass. The cellulose ether solution, which fills a great portion of the interspaces between the calcium hydroxide particles, binds more rapidly and prevents after binding the calcium hydroxide particles from being pulled closer to each other on the evaporation of water. By a suitable selection of the amounts of the two kinds of binding agents it is possible to obtain, as already indicated, a mass or compound which when used neither shrinks nor cracks. Particularly good results have been obtained by using one part of cellulose ether for five parts of slaked lime, but satisfactory results have been obtained with a finishing mortar in which the ratio between the amounts of cellulose ether and slaked lime varies between the limits 1:3 and 1:10. As a base material there is used in the finishing mortar according to the invention, as in previously known finishing mortars, an inorganic stone material, for instance sand of different sizes of grain. To secure good workability and strength it is of particular importance that the stone material has a suitable composition. In ordinary finishing mortar the largest grains should be not larger than 2 millimeters, but in the finishing mortar according to the invention the size of the said grains should not exceed 1 millimeter, and preferably not .5 millimeter. Conventional finishing mortar should contain a rather small amount of fine-grained material, so-called filler, which effects the plasticity of the mortar; in the finishing mortar according to the invention, on the other hand, the greater part of the inorganic stone material, preferably 94 to 98 percent by weight of the stone material, should consist of fine-grained filler. Crushed crystalline lime stone is suitable, but particularly suitable is marble or dolomite powder. The rest of the stone material should be still more finely divided and preferably should consist of earthy lime stone, as a rule chalk. The percentage of chalk is of great importance. Too much chalk gives a smeary mass, too little chalk gives a reduced workability and reduced strength. The chalk or the like should amount to 2 to 6 percent by weight of the marble powder, preferably 3 to 5 percent. The mass is also very sensitive to the amount of binding agent in relation to the amount of stone material. Chalk and slaked lime should preferably be present in substantially the same amounts by weight, but the proportions between chalk and slaked lime can vary between 1:2 and 2:1.

Below an example of a suitable composition of the finishing mortar according to the invention is given:

| | Percent by weight |
|---|---|
| Marble powder | 65 to 80 |
| Chalk | 2.1 to 4.2 |
| Powder-lime | 2.0 to 4.3 |
| Cellulose ether | 0.5 to 0.8 |
| Water | 10.7 to 30.4 |

The manufacture of the finishing mortar according to the invention may be carried out by first dissolving the cellulose ether in a portion of the water, then mixing the solid constituents with the solution thus obtained, and adding the rest of the water during the mixing operation. The finishing mortar may be produced either industrially and be delivered in closed vessels, or else it can be produced at the place where it is to be used.

A finishing mortar produced according to the invention gives a more finely grained surface than previously known finishing mortars, so that paint may be applied directly on the mortar surface without previous application of putty or the like. For the painting all kinds of paints may be used. Wall paper may be pasted directly on to the finished wall surface without first having to glue the surface.

A considerable improvement of the properties of the new finishing mortar is obtained according to a further development of the invention by the addition of substances with gel forming properties. In this manner the amount of water may be reduced and, what is more important, the mass will be such that it smears on a tool, e.g. a spatula, and adheres to the tool in any position but completely slides off the same tool when the mass is pressed against the wall with the aid of the tool. This behaviour probably depends on that the wall is drier than the spatula and that the pressure surface between the mass and the spatula is smaller than that between the mass and the wall. On the spatula there is therefore formed a watery sliding surface consisting of a thin colloidal solution of the gel forming substance in water. As gel forming substances may be used gelatin or bentonite, for instance. Gelatin, which is an organic material, may grow mouldy, however, particularly if used in too large amounts, whereas bentonite is an inorganic material which cannot become mouldy and therefore is preferred. Bentonite is a generic term for clays the properties of which agree with those of a clay formed by disintegration of volcanic ashes and found in the Black Hills in the United States of America. Bentonite forms with water thixotrope dispersions, i.e. it has a capacity of absorbing water in amounts several times its own weight, then swelling to several times its own volume in dry condition. The swelling is reversible, so that a clay may be dried and then made to swell anew. When using bentonite in the present particular finishing mortar it has been found that too great addition of bentonite gives a surface which cracks, whereas too small an amount rapidly reduces the workability of the mass. The best results have been obtained by an addition of about 2 percent by weight of bentonite.

A finishing mortar having the following composition has been found to be particularly suitable:

| | Percent by weight |
|---|---|
| Marble powder | 64 to 79 |
| Chalk | 2.0 to 4.1 |
| Powder-lime | 1.9 to 4.2 |
| Cellulose ether | 0.4 to 0.7 |
| Bentonite | 1.5 to 3.0 |
| Water | 15.0 to 24.0 |

Said finishing mortar may be produced by dissolving the cellulose ether and dispersing the bentonite or the like in different vessels. The cellulose ether solution and the dispersion of bentonite are then poured into a mixer, and immediately thereafter the powder-lime and the other solid materials are added in an arbitrary order of sequence. The mass thus obtained has a volumetric weight of 1.7. In case a mass having a smaller volumetric weight and a greater plasticity is desired, the cellulose ether solution and the bentonite dispersion are mixed together for a certain time, for example during about ten minutes, before the other constituents are added to the mixer. In this manner a finishing mortar having a specific or volumetric weight of only about 1.4 is obtained.

The finishing mortar according to the invention has been found to adhere exceedingly well to smooth concrete surfaces. Onto such surfaces it may therefore be applied with the aid of a spatula and thus in very thin layers, for example of a thickness of 1 millimeter or less. The finishing mortar may also be applied to advantage by spraying. Particularly in cases when it is desired to apply the finishing mortar on the wall with the aid of a spatula, it is of importance that it contains bentonite or other water accumulating agent, since such an agent gives the mass a more stable consistency, so that it is more easily applied with the aid of a spatula.

I claim:

1. A finishing mortar consisting essentially of a mixture of about 66 to 83% by weight of fine-grained inorganic filler in which the size of the grains is not in excess of one millimeter, finely powdered dry-slaked lime, water soluble ethyl cellulose ether, bentonite as a gel forming agent, and water, the ratio between the amounts of ethyl cellulose ether and dry-slaked lime being between about 1 to 3 and 1 to 10, the dry-slaked lime in the mixture supplying a sufficient amount of calcium carbonate when reacted with carbon dioxide to bind the mortar, and the ethyl cellulose ether acting as a binding agent to prevent shrinkage of the mortar as the water evaporates.

2. A finishing mortar according to claim 1, in which the inorganic filler material consists of a mixture of marble powder and chalk.

3. A finishing mortar consisting essentially of a mixture of about: 64 to 79% by weight of marble powder in which the size of the grains is not in excess of one millimeter, 2 to 4.1% by weight of chalk, 1.9 to 4.2% by weight of finely powdered dry-slaked lime, .4 to .7% by weight of water soluble ethyl cellulose, 1.5 to 3% by weight of bentonite as a gel forming agent, and 15 to 24% by weight of water, the ratio between the amounts of ethyl cellulose ether and dry-slaked lime being between about 1 to 3 and 1 to 10, the dry-slaked lime in the mixture supplying a sufficient amount of calcium carbonate when reacted with carbon dioxide to bind the mortar, and the ethyl cellulose ether acting as a binding agent to prevent shrinkage of the mortar as the water evaporates.

References Cited in the file of this patent

UNITED STATES PATENTS

| | | |
|---|---|---|
| 67,868 | Gariboldi | Aug. 20, 1867 |
| 406,585 | King | July 9, 1889 |
| 433,861 | Haigh | Aug. 8, 1890 |
| 1,670,425 | Schnell | May 22, 1928 |
| 1,703,125 | Underwood et al. | Feb. 26, 1929 |
| 1,876,122 | Wood | Sept. 6, 1932 |
| 2,000,371 | Bauer | May 7, 1935 |
| 2,083,961 | New | June 15, 1937 |
| 2,398,047 | Schmidt | Apr. 9, 1946 |
| 2,476,306 | King | July 19, 1949 |
| 2,599,445 | Gordon | June 3, 1952 |

FOREIGN PATENTS

| | | |
|---|---|---|
| 8,607 | Great Britain | of 1840 |
| 429,284 | Italy | June 21, 1948 |